Patented July 28, 1942

2,291,510

UNITED STATES PATENT OFFICE 2,291,510

POLYMERIZATION QUENCHING PROCESS

Robert M. Thomas, Union, and Edward J. Dahlke, Westfield, N. J., assignors, by mesne assignments, to Jasco, Incorporated, a corporation of Louisiana No Drawing. Application April 20, 1940, Serial No. 330,692

4 Claims. (Cl. 260—32)

This invention relates to low temperature polymerization processes; relates particularly to means for quenching or arresting the polymerization reaction at or near the low polymerization temperature, to maintain the highest possible average molecular weight in the polymer produced; and relates especially to a catalyst-quenching material which is non-reactive at the polymerization temperature, but becomes reactive and effective to quench the catalyst at a slightly higher temperature, below a temperature at which undesired polymer substances are produced.

It has been found possible to polymerize, or copolymerize, or interpolymerize a considerable number of olefinic substances, especially at very low temperatures, by the application to the olefinic substance or mixture at low temperature of Friedel-Crafts type catalysts to produce relatively very high molecular weight polymeric substances which are chemically nearly saturated, and of plastic, elastic, rubbery character. In this polymerization reaction it is found that the lower the temperature at which the polymerization is conducted, the higher the molecular weight of the polymer obtained. Also, it is found that usually a portion only of the polymerizable olefinic material can be polymerized into the desired high molecular weight polymer, even when the reaction occurs at the lowest possible temperature. This limitation is particularly applicable to mixtures of olefinic substances to be polymerized into high molecular weight sulfurizable polymers. Because of this limitation, a substantial amount of the olefinic material remains in the reaction mixture along with a substantial proportion of catalyst; and when the reaction mixture is warmed up to room temperature, by the volatilization of the refrigerant or diluent refrigerant, the polymerization reaction may continue at these temperatures between the polymerization temperature and room temperature until all of the olefinic material which is volatile below room temperature has also been boiled off. Because of these factors, a considerable secondary polymerization may occur at undesirably high temperatures and in undersirable mixture proportions, resulting in undesired polymers of lower molecular weight than is obtainable by the desired reaction, and of characteristics which may be harmful to the desired polymer.

The desirable temperatures for the polymerization reaction range from the temperature of solid carbon dioxide at —78° C. to the temperature of mixtures containing liquid ethylene at from —98° to —103° C., and even lower to temperatures as low as —150° or —161° C. as set by mixtures containing liquid methane. But the boiling point of isobutylene under atmospheric pressure is approximately —6.7° C., and in consequence when the polymerization is carried out at temperatures of —78° C. or lower to the desired stage, on warming up the reaction mixture, residual quantities of olefins in the presence of the catalyst, continue to polymerize at progressively higher temperature in a secondary polymerization reaction which may yield considerable amounts of undesirably low molecular weight material.

To avoid the occurrence of this secondary reaction, and to avoid the production of such undesired low molecular weight polymer substances, the catalyst may be quenched or destroyed or inactivated at or near the low polymerization temperature, and before the reaction mixture warms up appreciably from the temperature set by the refrigerant, since in the absence of active catalyst no polymerization occurs and no undesired low molecular weight material is produced by the above mentioned secondary polymerization reaction at higher temperatures than desired for the production of polymer.

The present invention quenches the catalyst by a new procedure and a new type of reaction in which the reaction mixture contains during the reaction a substance capable of quenching or inactivating the catalyst at a temperature slightly above the polymerization temperature, but is inactive at the polymerization temperature. The preferred quenching substance is ammonia and the invention depends upon the fact that the desirable polymerization temperature is below the melting point of ammonia. The melting point of ammonia is approximately —77° C., and the desired polymerization temperature is from —78° C. to —98° C. to —150° C.; and the further fact that solid ammonia at these desirable polymerization temperatures is non-reactive with the catalyst, whereas liquid or gaseous ammonia at temperatures higher than —77° C. reacts strongly with the catalyst to cause an immediate inactivation of the catalyst by converting the catalyst into a complex double compound of ammonia and the inorganic metal halide catalyst or by a metathetical reaction to produce substances all of which are inactive as catalysts. Thus, the solid ammonia being wholly non-reactive may be added to the reaction mixture at any desired stage, preferably in as finely divided form as possible, and it remains present in the reaction mixture as an inert and inactive substance as long as the temperature remains below the freezing point of the ammonia, and at or near the desired polymerization temperature. At such temperatures the solubility of the solid ammonia in the reaction mixture is sufficiently low to avoid interaction with the catalyst or interference with the polymerization reaction, but the polymerization proceeds normally in the presence of the inert solid ammonia. At the close of the reaction procedure, the refrigerant may be allowed to vaporize from the reaction mixture, and as soon as the refrigerant has volatilized sufficiently to permit the temperature to rise above the set temperature, the ammonia melts or vaporizes and combines immediately with the catalyst to destroy the catalytic properties thereof. Alternatively, the solid polymer may be removed from the reaction mixture and warmed up to room temperature. As soon as adherent portions of the reaction mixture rise in temperature, the ammonia melts and vaporizes to destroy residual traces of catalyst upon the surface, and as the warming up of the solid proceeds, any occluded mixtures of olefins, catalyst and solid ammonia are prevented from polymerizing by the melting or vaporizing of the ammonia to destroy the catalyst and permit the vaporization of refrigerant olefins, ammonia, etc., and ultimately, the washing out of the reaction products between the ammonia and the catalyst thereby avoiding any polymerization at temperatures above the melting point of the ammonia.

This reaction is advantageously applicable to the polymerization of isobutylene alone whether by gaseous boron trifluoride or dissolved aluminum chloride; it is equally advantageously applicable to the polymerization of olefinic mixtures such as isobutylene and a diolefin including butadiene, isoprene, dimethyl butadiene, pentadiene and similar diolefins which may be polymerized by the application of such catalysts as boron trifluoride or aluminum chloride as catalysts and especially catalysts such as aluminum chloride dissolved in a solvent such as ethyl or methyl chloride or carbon disulfide. The reaction is similarly applicable to the polymerization of proplyene, either alone, or in admixture with other olefins; and to the polymerization of the higher olefins such as methyl ethyl ethylene, 3-methylbutene-1, 2-methylpentene-1 and copolymerization of such olefins with diolefins of the type above mentioned.

A preferred form of the invention utilizes ammonia, which is highly efficient for the purpose of the invention, however, other substances, especially substituted ammonias such as amines and similar compounds may be utilized. For this purpose, it is essential that the quenching agent be inactive at the polymerization temperature, preferably because solid and insoluble, and it is further essential for the invention that these substances become active at a temperature below the temperature at which undersired polymerization reactions occur, to produce unsatisfactory polymers.

Accordingly, the invention consists in the preparation of a polymerization mixture at a low temperature including a catalyst and polymerizable substance together with a substance which does not combine with the catalyst at the reaction temperature, but does combine with the catalyst for the inactivation thereof at a temperature only slightly above the polymerization temperature.

Thus, an object of the invention is to quench or inactivate a polymerization catalyst at a temperature near to the polymerization temperature by the inclusion in the polymerization mixture of a substance, such as ammonia, which is inert in the mixture at the polymerization temperature and becomes active at a temperature slightly above the reaction temperature to quench the catalyst at a temperature below that at which undesired reactions occur.

Other objects and details of the invention will be apparent from the following description.

The essence of the invention consists in the preparation of a polymerization mixture at low temperature, either with or without the desired catalyst, but including the quenching agent as above pointed out, in solid form. The reaction mixture preferably consists of an iso-olefin together with an internal refrigerant, additional copolymerates together with the catalyst-quenching agent as above described which is inactive at the polymerization temperature, and the catalyst. The mixture may consist of 100 parts of an iso-olefin such as isobutylene with from 100 to 500 parts of refrigerant which may be liquid ethylene or may be liquid ethane, or may be solid carbon dioxide to which may be added about 1 to 10 parts of gaseous boron trifluoride. Or the mixture may be prepared with from 70 to 99½ parts of isobutylene, ½ to 30 parts of a diolefin such as butadiene, isoprene, pentadiene, dimethyl butadiene, etc., 100 to 500 parts of liquid ethylene or liquid ethane and 1 to 50 parts of a 0.5% solution of aluminum chloride in ethyl chloride together with the solid ammonia substance of the invention. In either instance, from 1 to 15 parts of anhydrous ammonia $NH_3$, must be in the mixture either before or after the catalyst is introduced. The ammonia is preferably added as a solid, at or below its solidifying point, but it may be added as a liquid or as a gas, preferably to the diluent refrigerant such as the liquid ethylene or liquid ethane, if desired, before mixing the iso-olefin and diluent refrigerant. The ammonia may be added at room temperature down to the temperature set by the refrigerant, if it is added before the catalyst is introduced, but obviously it is preferable that the ammonia be as cold as possible in order to avoid loss of the refrigerant which is required to freeze the ammonia substance.

Upon the introduction of the catalyst, the reaction then proceeds in normal course, in spite of the presence of the solid ammonia, to produce the desired high molecular weight low unsaturation polymer. When the polymerization reaction is substantially complete, and the usual warming up of the reaction mixture occurs, the ammonia is converted from the solid state to a liquid as the temperature passes approximately —77° C., whereupon the liquid ammonia combines with the catalyst to produce the desired quenching or inactivating effect by converting the catalyst into inert substances, thereby allowing the mixture containing the solid polymer to warm up to room temperature by volatilization of the refrigerant and any other substance volatile below room temperature in the absence of an active catalyst and therefore without further polymerization of residual portions of the reactants, thereby preventing the production of undesired polymer substances.

Example 1

In a chilled container a mixture of 4000 parts of liquid ethylene was prepared with 25 parts of liquid ammonia and 2000 parts of liquid isobutylene. The ammonia solidified immediately in the form of a milky dispersion of particles of solid ammonia in the cold reaction mixture. To this mixture there was then added approximately 40 parts by weight of gaseous boron trifluoride as catalyst, the catalyst being bubbled through the reaction mixture. The polymerization reaction occurred immediately to yield the desired high molecular weight polymer, the ammonia being entirely inert and inactive with respect to the catalyst. A mixture of liquid ethylene and liquid isobutylene in these proportions has a temperature under atmospheric pressure of approximately −98° C., which is well below the freezing point of ammonia at −77° C. The polymerization continued during the introduction of the boron trifluoride and was largely complete within 10 minutes. At the close of this time, when the reaction was substantially complete, the polymer was removed from the reaction mixture and allowed to warm up to room temperature. As the warming occurred, residual quantities of liquid ethylene present in and on the polymer volatilized leaving small quantities of liquid isobutylene and solid ammonia present in and on the polymer together with small quantities of boron trifluoride. A portion of the residual isobutylene polymerized during the warming up period, but such polymerization yields high molecular weight polymers which are not undesirable. When the temperature of −77° C. was reached, the ammonia melted and immediately reacted with the residual boron trifluoride to destroy its catalytic power. During subsequent rise in temperature, no further polymerization occurred and therefore no undesired polymerization. Instead, the ammonia and isobutylene remaining in and on the polymer volatilized without further reaction. The residual traces of small quantities of reaction products of boron trifluoride and ammonia were removed from the polymer by washing with water after warming to room temperature or above.

The polymer produced by this procedure at the temperature of liquid ethylene in this mixture of about −97° C. had an average molecular weight of approximately 250,000. This material was dissolved in light petroleum naphtha and isopropyl alcohol added in successive small portions to produce a series of precipitated fractions. These fractions were found to have a relatively narrow molecular weight range, substantially no material having a molecular weight lower than about 100,000 being found in any of the fractions.

Example 2

In a cooled container, a mixture of 800 parts by weight of isobutylene was prepared with 200 parts by weight of solid carbon dioxide. To this mixture there was then added approximately 50 parts of methyl chloride and 15 grams of liquid ammonia which at the temperature of solid carbon dioxide of −78° C. became a relatively finely dispersed solid suspension in the liquid isobutylene. To this mixture there was then added approximately 20 parts by weight of gaseous boron trifluoride as catalyst, the catalyst being bubbled through the mixture. The desired polymerization reaction occurred promptly to produce the desired high molecular weight solid polymer. The reaction mixture was allowed to warm up, the solid carbon dioxide volatilizing first and carrying with it a substantial portion of the gaseous catalyst. When the solid carbon dioxide was substantially all volatilized, the temperture rose to the melting point of the solid ammonia, whereupon the ammonia melted and combined with residual traces of catalyst remaining in the reaction container together with the solid polymer and unpolymerized residual isobutylene, thereby preventing further polymerization of the residual isobutylene at temperatures above the melting point of the ammonia. Continued rise in temperature of the material brought it to the boiling point of isobutylene at a temperature of −6.7° C., whereupon the residual isobutylene was vaporized leaving the solid polymer with traces of the reaction product of ammonia and boron trifluoride. A washing treatment with water applied to the polymer destroyed the double salt by converting it into ammonium fluoride and boric oxide, both of which are readily washed out from the polymer by water.

Polymerization of the isobutylene at this temperature does not yield as high a molecular weight polymer as does polymerization with liquid ethylene. However, the polymer from this example has a molecular weight of approximately 80,000. The polymer was dissolved in light naphtha and precipitated by the addition of successive small quantities of isopropyl alcohol for a fractional precipitation procedure. The several fractions of polymer were found to lie near to the average molecular weight, and no polymer having a molecular weight lower than about 50,000 was found.

Example 3

In a chilled container a mixture was prepared containing 80 parts of isobutylene, 20 parts of butadiene, 250 parts of liquid ethylene, and 1 part of $NH_3$, which upon addition to the mixture became a relatively finely dispersed solid suspension in the liquid mixture. Fifty parts of a catalyst consisting of aluminum chloride dissolved in methyl chloride to the extent of approximately 0.5% was then added to the polymerization mixture by spraying it on to the surface of the rapidly stirred mixture. The polymerization reaction occurred promptly to yield a desired interpolymer of isobutylene and butadiene in the presence of the catalyst and the solid ammonia. When this reaction had proceeded to the point of polymerizing approximately three-fourths of the polymerizable constituents, the solid polymer was removed from the reaction mixture and allowed to warm up to room temperature. As in the previous examples, any traces of catalyst present in the polymer were destroyed or quenched by the ammonia, as soon as the temperature had risen to the melting point of the ammonia at −77° C.

Example 4

A mixture of 95 parts of isobutylene, 5 parts of dimethyl butadiene, 250 parts of liquid ethylene, and 1 part of ammonia was prepared in a chilled container as before, and 100 parts of a catalyst consisting of a saturated solution of aluminum chloride in carbon disulfide was added to the polymerization mixture by pouring it upon the surface of the rapidly stirred mixture. The polymerization reaction occurred as rapidly as before, and at the conclusion of the reaction the solid polymer was allowed to warm up to room temperature as before, in this instance also, the ammonia operating to quench the catalyst as soon as the temperature rose to the melting point of the ammonia.

Thus the invention broadly consists of the addition to the reaction mixture of a substance which is inert to the polymerization reaction at the polymerization temperature, but becomes active to quench the catalyst as soon as the temperature has risen substantially above the polymerization temperature. In the examples above presented this substance is ammonia which is inert at temperatures below its freezing point, and is operative to quench the catalyst as soon as the melting point of the ammonia is reached. The invention is not, however, limited to ammonia, but includes a wide range of other substances which are similarly operative at similar temperatures such as amines, alcohols, quaternary ammonium compounds, and the like.

The reaction is also applicable broadly to all low temperature polymerization reactions in which the character of the product is controlled and determined by the lowness of the temperature.

Thus the invention consists in the preparation of a polymerization mixture at low temperature, the inclusion in the mixture of a catalyst-quenching agent which is inactive at the polymerization temperature, the addition to the mixture of the polymerization catalyst, the catalyst-quenching agent being added either before or after the catalyst, and, after the polymerization has reached the desired stage, the warming up of the polymer to permit the catalyst-quenching agent to operate at a temperature well below room temperature, and close to the low polymerization temperature.

While there are above disclosed but a limited number of embodiments of the invention, it is possible to produce still other embodiments without departing from the inventive concept herein disclosed, and it is therefore desired that only such limitations be embodied upon the appended claims as are stated therein or required by the prior art.

The invention claimed is:

1. A polymerization mixture comprising isobutylene, a chilling agent, a Friedel-Crafts type catalyst, and solid ammonia.

2. A polymerization mixture comprising isobutylene, a diolefin, liquid ethylene, solid ammonia and a Friedel-Crafts type catalyst.

3. A polymerization mixture comprising isobutylene, a diolefin, liquid ethylene, solid ammonia and a Friedel-Crafts type catalyst comprising a solution of aluminum chloride.

4. A polymerization mixture comprising isobutylene, a diolefin, liquid ethylene, solid ammonia and a Friedel-Crafts type catalyst comprising a solution of aluminum chloride in an alkyl halide.

ROBERT M. THOMAS.
EDWARD J. DAHLKE.